(No Model.)
F. G. DAVIS.
SHIFTING SEAT FOR VEHICLES.
No. 511,515. Patented Dec. 26, 1893.
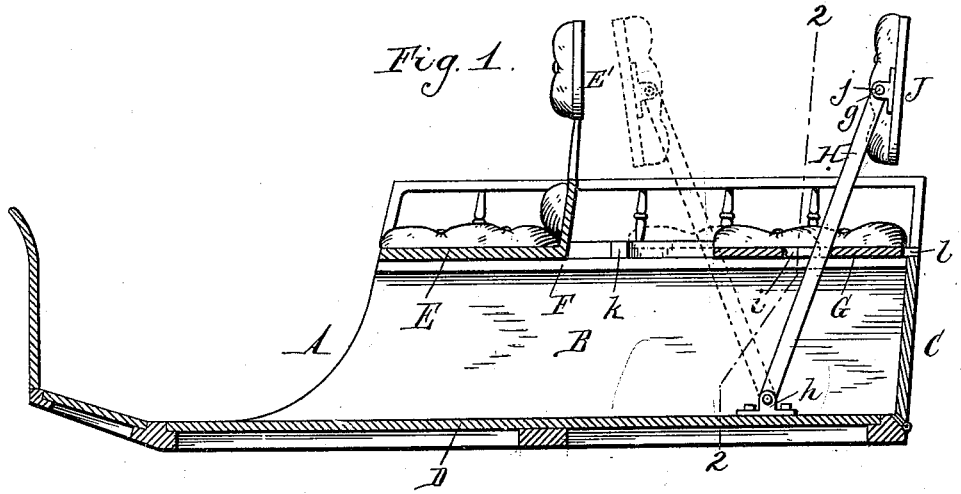
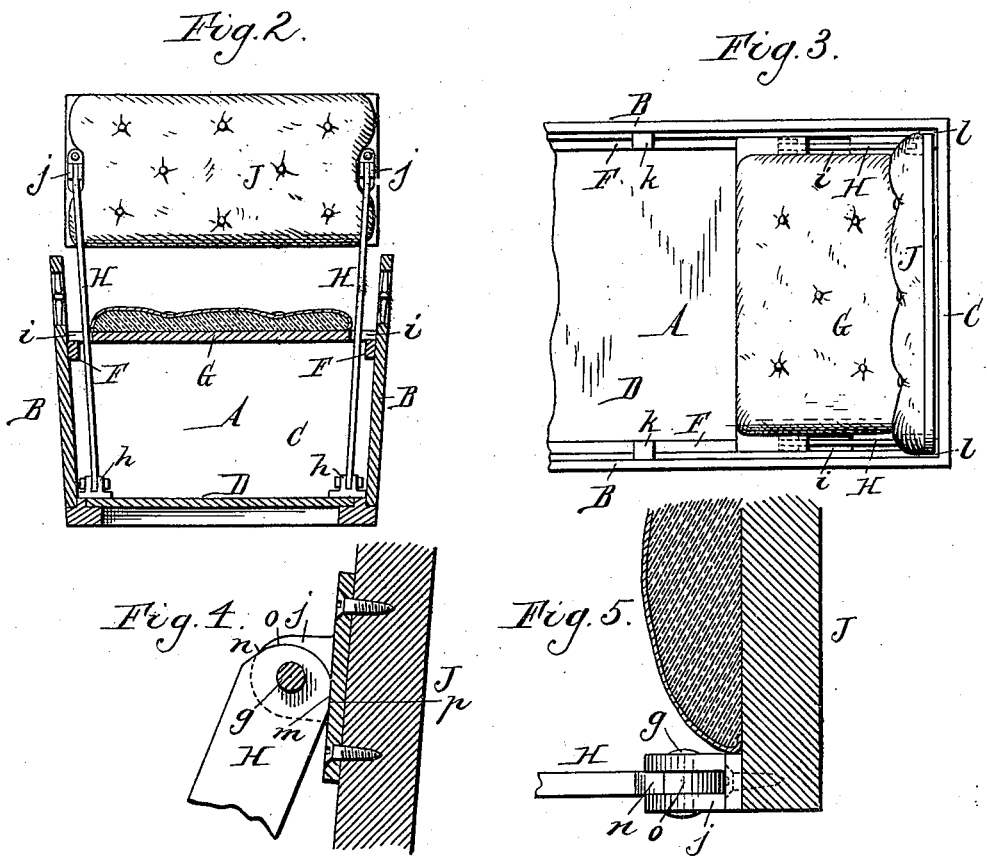
Witnesses:
Emil Neuhart.
Theo. L. Popp.
F. G. Davis, Inventor.
By Wilhelm Bonner, Attorneys.

UNITED STATES PATENT OFFICE.

FRANCIS G. DAVIS, OF WATERTOWN, NEW YORK, ASSIGNOR TO THE H. H. BABCOCK COMPANY, OF SAME PLACE.

SHIFTING SEAT FOR VEHICLES.

SPECIFICATION forming part of Letters Patent No. 511,515, dated December 26, 1893.

Application filed October 31, 1892. Serial No. 450,495. (No model.)

*To all whom it may concern:*

Be it known that I, FRANCIS G. DAVIS, a citizen of the United States, residing at Watertown, in the county of Jefferson, in the State of New York, have invented a new and useful Improvement in Shifting-Seat Vehicles, of which the following is a specification.

This invention relates to that class of vehicles which are provided with a stationary front seat and back upon which the occupants face forwardly, and a movable rear seat and back which can be shifted so as to permit its occupants to face either forwardly or rearwardly.

The object of my invention is to produce simple devices, whereby the movable rear seat and back can be easily shifted.

Figure 1 is a longitudinal sectional elevation of a vehicle body provided with my improvement. Fig. 2 is a vertical transverse section in line 2—2, Fig. 1. Fig. 3 is a top plan view of the rear portion of the vehicle, showing the movable seat and back facing forwardly. Fig. 4 is a vertical sectional elevation of the upper portion of one of the seat shifting bars, and the adjacent portion of the reversible back. Fig. 5 is a top plan view of the parts shown in Fig. 4 with the back in section.

Like letters of reference refer to like parts in the several figures.

A represents the body of the vehicle which consists essentially of the longitudinal side boards B, the hinged tail board C, and bottom D.

E represents the stationary front seat mounted upon the front portion of the side boards, and E' the back of the front seat.

F represents rails secured lengthwise to the inner sides of the side boards, and G is the movable rear seat which rests with its ends upon said rails and is capable of being shifted longitudinally thereon, so as to permit its occupants to face either forward or rearward.

H represents shifting bars or arms whereby the movable seat is shifted. These arms are pivoted with their lower ends to ears $h$ secured to the bottom of the body adjacent to the side walls thereof, and extend upwardly through notches $i$ formed in the sides of the movable seat. Upon moving the upper ends of the shifting arms forwardly or backwardly they slide the movable seat forwardly or backwardly on the longitudinal supporting rails.

J represents the movable back of the rear seat. This back is provided at both sides with bifurcated ears $j$, which are pivoted to the upper ends of the shifting arms, thereby permitting the back rest to be reversed to correspond with the position of the rear seat. When the rear seat and its back are shifted to their rearmost position in which the occupants face forwardly, the parts are in the position represented in full lines in Figs. 1 and 3. When it is desired to shift the rear seat and its back to their forward positions in which the occupants face rearwardly, the shifting arms are swung forwardly, which causes the arms to slide the seat forwardly until the parts assume the position indicated in dotted lines in Fig. 1, and the seat is reversed by swinging it on its pivot. The forward and backward movement of the rear seat is preferably limited by stops $k$ $l$ formed respectively upon the front and rear portions of the rails or by other suitable means. The rails upon which the rear seat slides support the weight of the seat and its occupants, while the swinging arms support only the reversible back and serve as the means for shifting the seat, whereby the operation of shifting the seat is rendered extremely simple, and the parts are enabled to be made very light without sacrificing the security. The upper end of each of the shifting arms H is provided on its rear side with a flat locking face $m$, and on its front side with a similar locking face $n$ and above the locking faces with a depressing top portion $o$. The ears $j$ which are secured to the back are each provided between their jaws with a flat locking face $p$, which bears against the rear face $m$ of the shifting arm when the seat faces forwardly, as shown in Fig. 4, and against the front face $n$ when the seat faces rearwardly, and so holds the seat in the desired position. The reduced upper portion permits the ear of the back to swing from one locking face to the other. In order to do this the reduced top portion should not extend from the center of the pivot bolt $g$ farther than the length of a radius from said center to the locking face of the ear at right angles to said face. In other words the flat locking faces on the shifting arms diverge from the pivot downwardly and the top portion of the arm between the locking faces is either concentric with the pivot or depressed below the concentric arc in order to permit the ear to swing over from one locking face to the other.

I claim as my invention—

1. The combination with the vehicle body provided with longitudinal supporting rails, of a seat capable of sliding on said rails, and shifting arms pivoted with their lower ends to the body below the shifting seat and having their middle portions bearing against said seat, substantially as set forth.

2. The combination with the vehicle body provided with longitudinal supporting rails, of a seat capable of sliding on said rails, and provided with notches in its sides, and shifting arms pivoted with their lower ends to the body below the seat and arranged with their middle portions in said notches, substantially as set forth.

3. The combination with the vehicle body provided on its side wall with longitudinal supporting rails, of a seat capable of sliding on said rails and provided with notches in its sides, shifting arms pivoted with their lower ends to the body below the seat and arranged with their middle portions in said notches, and a reversible back pivoted to the upper ends of the shifting arms, substantially as set forth.

Witness my hand this 27th day of October, 1892.

FRANCIS G. DAVIS.

Witnesses:
  THEO. L. POPP,
  FRED. C. GEYER.